Dec. 29, 1959     E. W. HOUGHTON     2,919,345
MICROWAVE DETECTOR
Filed April 6, 1956     3 Sheets-Sheet 1
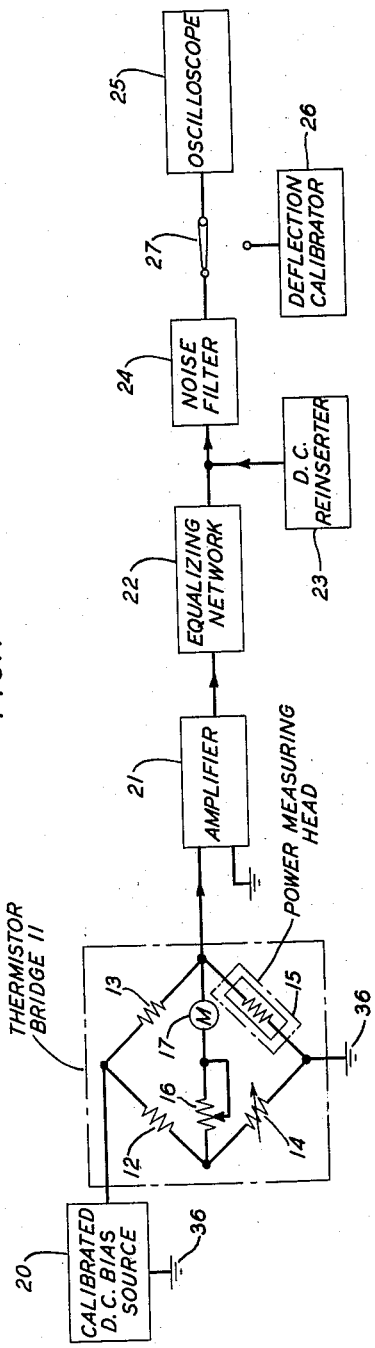
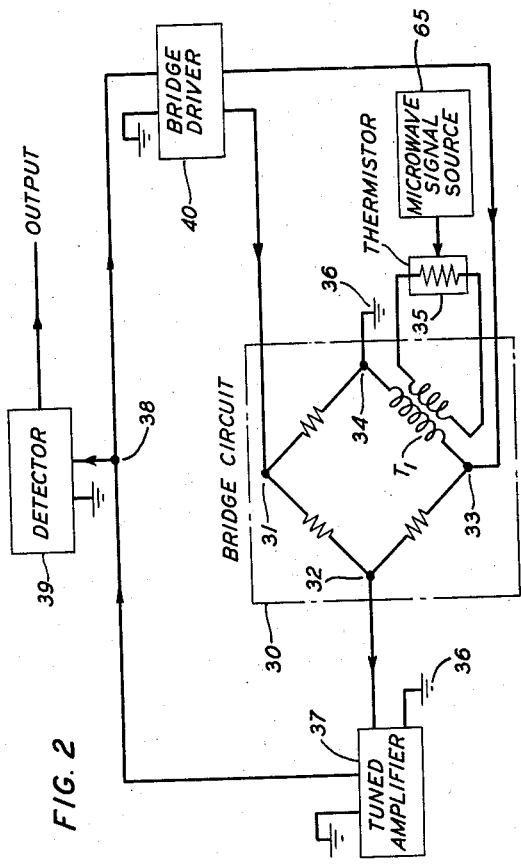
INVENTOR
E. W. HOUGHTON
BY
ATTORNEY

INVENTOR
E. W. HOUGHTON
BY
ATTORNEY

Dec. 29, 1959  E. W. HOUGHTON  2,919,345
MICROWAVE DETECTOR
Filed April 6, 1956  3 Sheets-Sheet 3

INVENTOR
E. W. HOUGHTON
BY
ATTORNEY

United States Patent Office 2,919,345
Patented Dec. 29, 1959

2,919,345

MICROWAVE DETECTOR

Edward W. Houghton, Chatham, N.J., assignor to Bell Telephone Laboratories, Incorporated, New York, N.Y., a corporation of New York Application April 6, 1956, Serial No. 576,685

5 Claims. (Cl. 250—27)

This invention relates generally to wave detection in electrical transmission systems and in particular to the detection of amplitude modulation in high frequency systems.

One of the most reliable detector of power level at frequencies above 1000 megacycles per second is a thermal resistor operating on the bolometer principle of resistance change in the presence of a temperature rise created by the absorption of microwave energy. Substantially all of the microwave energy is absorbed in the thermal resistor, and ideally the energy absorption is independent of the frequency of excitation. In order to detect minute changes in resistance of the thermally sensitive resistor, bridge circuits are commonly employed. The high frequency power to be measured is absorbed by the thermally sensitive resistor whereby its temperature and resistance are changed, thus unbalancing the bridge. Various indicating devices have been employed in the prior art to interpret the unbalance in terms of the power to be measured. Some of these indicating devices employ auxiliary means for returning the bridge to balance by changing the power dissipation in the thermally sensitive resistor. The auxiliary means is calibrated in terms of power and the change in power to rebalance the bridge is then taken as the amount of the high frequency power. Refinements in bridge circuits of this type are shown, for example, in my Patent No. 2,449,072, issued September 14, 1948.

A common form of thermally sensitive resistor which has been widely used in this art is the thermistor, a type of non-linear circuit element composed of semi-conductive material whose electrical resistance varies rapidly with changes in temperature.

While thermistors have a constant sensitivity on steady state signals independently of frequency, a principal disadvantage which has heretofore prevented their use in detecting instantaneous power levels is their slow response time to changes in frequency of the order of one second. The prior art circuits have been for the most part limited to the measurement of average power level. What is particularly desired is a means for employing the thermal sensitivity of thermistors at high frequencies for detection of amplitude modulation of microwave signals having modulating rates up to eight kilocycles per second.

At present, crystal diode rectifiers are commonly used as amplitude modulation detectors at microwave frequencies and are quite suitable for use in ordinary microwave receivers such as are employed in radar and radio relay applications. However, when precise measurements of spurious amplitude modulation are required, for example in testing microwave transmission components in a frequency-modulation system, it is found that crystal diodes are comparatively erratic and their sensitivites are at best constant to ±0.2 decibel, and may vary as much as ±2 decibels for a ten percent change in carrier frequency. For certain required measurements of microwave tranmission deviations, accuracies of less than ±0.02 decibel are desired.

It is accordingly a principal object of this invention to increase the accuracy of detection of the modulation envelope of high-frequency waves.

It is a further object of this invention to make possible the use of thermistors as modulation detectors of great precision at microwave frequencies.

The foregoing objects are achieved in an illustrative embodiment of the invention by providing, in combination, a measuring bridge having a thermistor in one of its arms and means for applying the high frequency wave to be detected to this thermistor to change its temperature and hence its resistance. A low frequency oscillator including a high gain amplifer is coupled to this bridge to form a bridge-stabilized oscillator in such a way as to adjust its power level instantaneously to substantially rebalance the bridge and maintain the net change in power delivered to the thermistor by the microwave energy and the oscillator at zero. Thus the variations in the low frequency oscillator power level are in proportion to the amplitude modulation envelope of the microwave signal. The variation in oscillator power level can be detected by conventional means and observed, for example, on an oscilloscope.

A particular feature of this invention is that the bridge is automatically maintained in balance at all times, so that continuous observation of the desired modulation envelope is made possible. This feature also permits the interchanging of thermistors without any necessity for making adjustments in the bridge circuit.

A further feature of this invention is the elimination of any requirement for an equalizing network to compensate for the frequency response characteristic of the thermistor. The high gain of the oscillator limits the change in thermistor resistance to a small percentage of the total change that would have taken place without the presence of bridge feedback action.

Another feature is that only one initial zero setting adjustment of the detector output circuit is required when practicing this invention.

The invention may be better understood by referring to the accompanying drawings in which:

Fig. 1 is a block schematic diagram of a circuit that may be used for compensating for the poor frequency response of a thermistor using conventional equalizing means;

Fig. 2 is a block schematic diagram of microwave detector circuit employing a thermistor in accordance with this invention;

Figure 3:
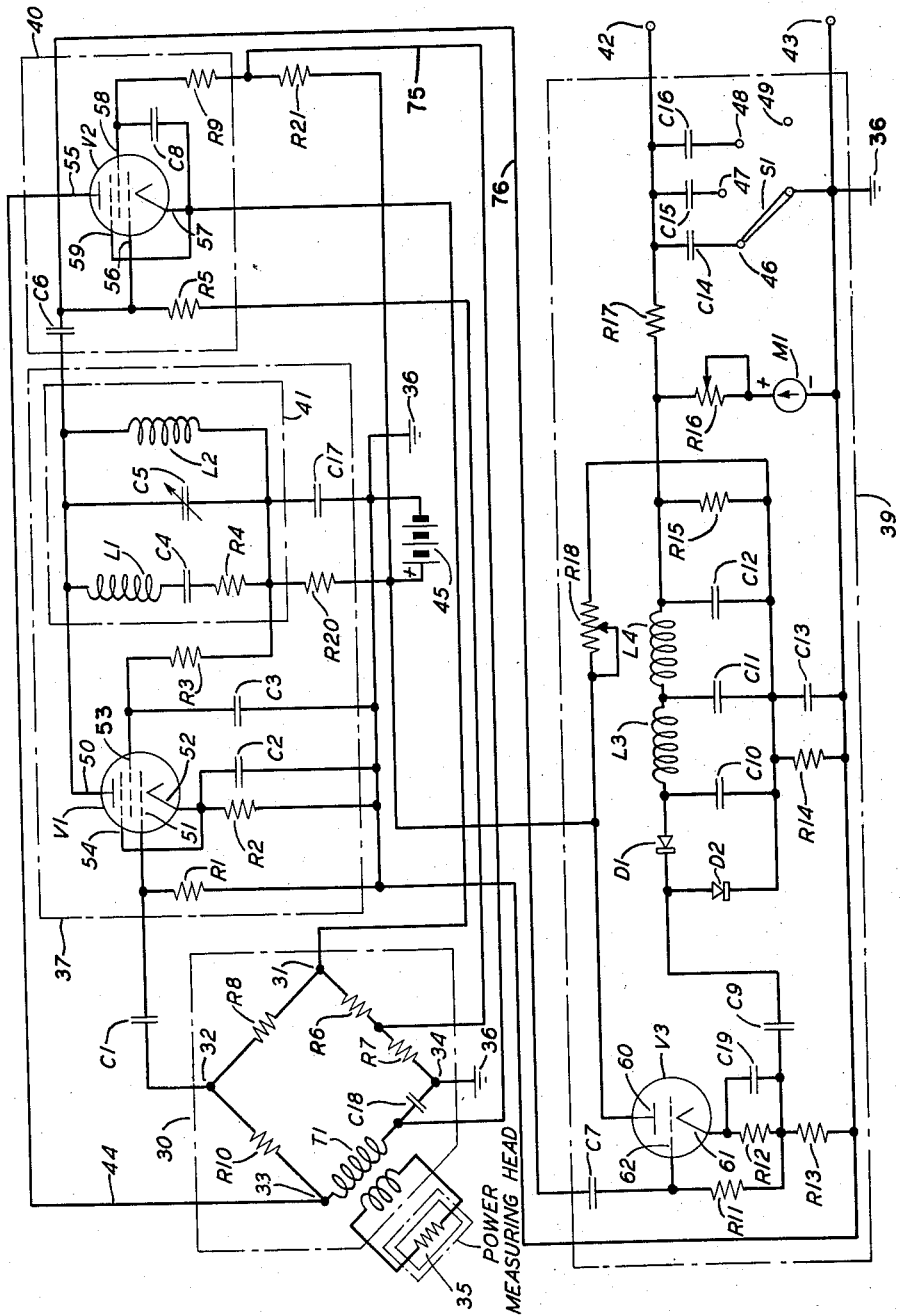
Fig. 3 is a complete operative schematic diagram of a microwave detector in accordance with this invention.

Fig. 1 shows in block schematic form a system for detecting amplitude modulation by what might be considered a "brute force" method. The thermistor 15, which is mounted in waveguide or coaxial line measuring head, absorbs high frequency energy delivered to it from a waveguide or coaxial line. The bridge 11, comprising resistive arms 12, 13, and 14 and thermistor 15 is balanced by direct-current from a calibrated source 20 connected across the vertical diagonal of the bridge. One corner of the bridge is grounded at point 36. Direct-current meter 17 connected in series with variable resistor 16 across the horizontal bridge diagonal indicates the balance condition. Initially the bridge is balanced, with no high frequency energy applied to the thermistor 15, by adjusting the calibrated direct-current bias source until the meter 17 indicates zero current. When the thermistor becomes heated by the application of high frequency power, its resistance will decrease (assuming a negative coefficient of resistance—the usual case) and the bridge will be come unbalanced. The sensitivity of the bridge can be made by appropriate choice of value for arms 12 and 13 such that an average power of one milliwatt into the thermistor produces a full-scale deflection on meter 17. The sensitivity of the meter is controllable to a limited extent by adjustment of resistor 16. The change in direct-current power from bias source 20 to rebalance the bridge is an indication of the high-frequency power being absorbed by the thermistor 15.

If now the high-frequency carrier is amplitude modulated by a sine wave the thermistor's resistance will attempt to follow the modulation. However, it has been found that the thermistor's response to sine waves falls off at the rate of approximately six decibels per octave or twenty decibels per decade. In order to reproduce the amplitude modulation, therefore, it becomes necessary to equalize or compensate the thermistor's relatively slow response to the fast-changing microwave carrier level. In "Technique of Microwave Measurements," by C. G. Montgomery (McGraw-Hill Book Co., 1947) at page 100, it is suggested that such an approach is feasible.

Accordingly, the decreasing response of the thermistor can be compensated by a network having a response which increases at the same rate. A network composed of a series of sections of paralleled resistors and capacitors, such as are outlined on page 246 of "Radio Engineer's Handbook" by F. E. Terman (McGraw-Hill Book Co., 1943) can be used for this purpose. The equalizing network is indicated in block 22 in Fig. 1. In order to equalize to, say 8500 cycles per second and maintain at the same time a satisfactory signal-to-noise ratio, a linear amplifier 21 is used to amplify the output of thermistor 15. Amplifier 21 might appropriately comprise a three-stage amplifier having a gain of the order of 60 decibels.

Following the equalizer an adjustable filter 24 composed of a series resistor and a group of selectable shunt capacitors will reduce the overall bandwidth and improve the signal-to-noise ratio.

Inasmuch as the average or direct-current level of the detected wave is not transmitted through amplifier 21, a direct-current reinsertion circuit 23 is provided after equalizing network 22. The reinserter is a voltage divider having selectable taps placed in shunt with the equalizer output. To calibrate and equalize the detector the high-frequency signal applied to the thermistor is 100 percent amplitude modulated by a sixty cycle per second square wave. If the peak carrier power is then two milliwatts, for example, the average power is one milliwatt. Further, if the equalizer output is then one volt peak-to-peak, a reinsertion voltage of one-half volt is applied to the equalizer output to establish the average value of the square wave. This average value corresponds to an input level of zero dbm (decibels referred to one milliwatt). Other taps on the reinsertion voltage divider may be set to correspond to average power levels of —3, —6 and —10 dbm. Proper setting of the reinsertion level is determined from the average power level measured by the bridge network 11 and bias source 20.

The circuit just described may be called simply an equalized detector circuit. The output may be observed conventionally on an oscilloscope, represented by block 25, having a direct-current amplifier. Block 26 represents a deflection calibration circuit which may be connected to the oscilloscope to determine the deflection sensitivity. Switch 27 may be driven by an external switching voltage (not shown) at a low-frequency rate so that a calibrated reference level line may be observed on the oscilloscope simultaneously with the modulation envelope being displayed. The deflection calibration circuit enables an operator to read, in decibels, the difference between any two selected points on the waveform with a resolution of better than 0.1 decibel.

The principal disadvantages of the equalized detector circuit just described are: (1) replacement of thermistors in the measuring head necessitates complete re-equalizing because of differences in thermistor response characteristics; (2) bridge network balance must be frequently checked to insure that the thermistor is operating at the proper resistance; and (3) reinsertion of the average value of the demodulated waveform from an external voltage source is required.

These disadvantages are overcome in accordance with the principles of this invention by using the thermistor in a bridge-stabilized oscillator circuit, which is herein referred to as a servo-oscillator detector circuit. A block schematic diagram of a thermistor amplitude demodulator circuit in accordance with the invention is shown in Fig. 2. The thermistor 35 is connected as one arm of an alternating-current bridge circuit 30 by means of transformer T1 between points 33 and 34 of the bridge. The other three arms of the bridge comprise resistors. Junction 34 is grounded at point 36. Junction points 32 and 34 define the output diagonal of the bridge and points 31 and 33 define the input diagonal. To the output diagonal between points 32 and 34 is coupled a high-gain tuned amplifier 37 responsive to unbalance currents in the bridge. The output of amplifier 37 feeds a bridge driver stage 40, the output of which is coupled to the input diagonal defined by points 31 and 33. Taken together bridge 30, amplifier 37, and driver 40 constitute a bridge-stabilized oscillator of the type shown in United States Patent 2,163,403, issued on June 20, 1939, to L. A. Meacham.

When the oscillator, which may operate at the relatively low frequency of 260 kilocycles per second (contrasted with the high frequency being delivered to the thermistor of the order of six kilomegacycles per second) is first activated, the thermistor resistance is high and the bridge is unbalanced. This condition causes a large regenerative voltage to be fed back from the output of driver stage 40 to the grid of the tuned amplifier 37. The feedback action will continue until the level of oscillations has become high enough to heat the thermistor and reduce its resistance. As described in the Meacham patent cited above, the steady-state resistance value is slight above that which will balance the bridge circuit. The actual degree of unbalance is, of course, determined by the loop gain of the servo-oscillator.

Figure 5:
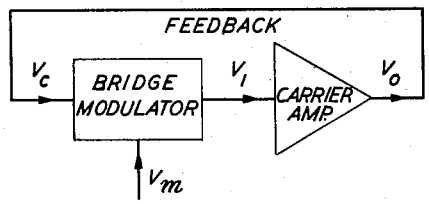
Fig. 5 is a simplified block diagram aiding in the explanation of the theory of operation of this invention.

When high-frequency power is applied to the thermistor from the microwave signal source 65, the servo-oscillator power decreases just enough to keep the net change in power delivered to the thermistor at zero. When the high-frequency carrier is being modulated with a sine wave or square wave, there accordingly results a variation in the servo-oscillator power equal and opposite to that of the microwave power. As shown in Fig. 5 the loop gain of the servo-oscillator is high enough to limit the change of thermistor resistance to a small percentage of the total change that would take place without the sensitive bridge feedback action.

While a detailed discussion of the theory of operation of the servo-oscillator is believed unnecessary, the following approximate mathematical analysis is presented by way of explanation.

In Fig. 5, a simplified block diagram shows the essentials of the servo-oscillator circuit. $V_m$ represents the high-frequency carrier voltage applied to the thermistor arm of the bridge modulator; $V_c$ represents the servo-oscillator carrier (260 kc.) voltage feeding the bridge modulator and tending to maintain the net power change in the thermistor zero at all times; $V_1$ represents the unbalance voltage appearing at the output of the bridge modulator; and $V_0$ represents the output voltage of the high-gain amplifier in the servo-oscillator circuit. For the purpose of this analysis it may be assumed that $V_m$ and $V_c$ are constant.

By inspection of Fig. 5 the following expressions, neglecting all terms beyond the first order, may be written $$dV_1 = \frac{\partial V_1}{\partial V_c}dV_c + \frac{\partial V_1}{\partial V_m}dV_m + \quad (1)$$

Also $$dV_0 = \frac{\partial V_0}{\partial V_1}dV_1 \quad (2)$$

It will be understood that $$\frac{\partial V_1}{\partial V_c}$$

is negative in this application in that an increase in carrier voltage $V_c$ causes a decrease in carrier level at $V_1$ since the bridge is being brought nearer to balance by the feedback arrangement. However, to make the equations general, no polarities are assigned to the quantities under discussion.

Because $V_0$ is fed back to the bridge modulator input, $$dV_c = dV_0 = \frac{\partial V_0}{\partial V_1}dV_1 \quad (3)$$

Substitution of Equation 3 in Equation 1 and clearing results in the following expression relating the change in the output voltage of the bridge to the change in voltage at the thermistor due to the microwave energy absorbed thereby:

$$\delta dV_1 = \frac{\frac{\partial V_1}{\partial V_m}dV_m}{1 - \frac{\partial V_1}{\partial V_c} \times \frac{\partial V_0}{\partial V_1}} \quad (4)$$

Equation 4 shows concisely that any change in the output of the bridge modulator $dV_1$ is proportional to the change in modulation of the microwave carrier $V_m$.

Figure 6:
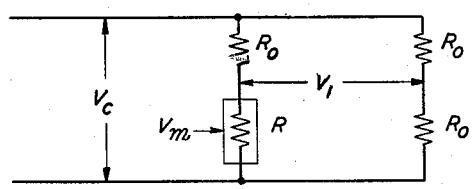
Fig. 6 is a simplified schematic diagram of the bridge circuit, aiding in the explanation of the theory of operation of this invention.

By looking further to the inside of the bridge modulator block as shown in Fig. 6, Equation 4 may be further analyzed. $V_c$, $V_m$, and $V_1$ represent the same quantities as in Fig. 5. In addition, $R_0$ represents the resistance of the bridge arms in the balanced condition when no modulation of the microwave carrier $V_m$ is present and $V_c$ is adjusted to cause the bridge to be in balance, that is, the resistance $R$ of the thermistor equals $R_0$ at balance and further matches the impedance of the measuring head.

At balance $V_1$ equals zero, but for any change $\Delta R$ in the resistance $R$ of the thermistor due to modulation of $V_m$, $$V_1 = kV_c \quad (5)$$

where $k$ is the transfer characteristic of the bridge. For small values of change in thermistor resistance $R$, as is well known in the bridge art $$k \cong \frac{R - R_0}{2R_0} \quad (6)$$

whence $$dk = \frac{dR}{2R_0} \quad (7)$$

Substituting Equation 7 in Equation 1 and letting $V_c$ be held constant, $$\frac{\partial V_1}{\partial V_m}\Big]_{\partial V_c = 0} = \frac{\partial (kV_c)}{\partial V_m} = \frac{V_c \partial k}{\partial V_m} = \frac{V_c}{2R_0} \times \frac{\partial R}{\partial V_m} \quad (8)$$

Equation 8 may be rewritten as follows:

$$\frac{\partial V_1}{\partial V_m} = \frac{V_c}{2R_o} \times \frac{\partial R}{\partial P_m} \times \frac{\partial P_m}{\partial V_m} \quad (9)$$

Let $P_m$ be the power delivered to the thermistor by the microwave energy. Then $$P_m = \frac{V_m^2}{4R}$$

whence $$\frac{\partial P_m}{\partial V_m} = \frac{V_m}{2R} \quad (10)$$

Substitution of Equation 10 in Equation 9 yields $$\frac{\partial V_1}{\partial V_m}\Big]_{\partial V_c = 0} = \frac{V_c V_m}{4R_o} \times \frac{\partial R}{\partial P_m} \times \frac{1}{R} = \frac{V_c^2}{4R_o} \times \frac{V_m}{V_c} \times \frac{\partial R}{\partial P_m} \times \frac{1}{R} \quad (11)$$

Similarly substitution of Equation 7 in Equation 1 yields (letting $V_m$ be regarded as constant and taking the partial derivative)

$$\frac{\partial V_1}{\partial V_c}\Big]_{\partial V_m = 0} = \frac{\partial (kV_c)}{\partial V_c} = k + V_c \frac{\partial k}{\partial V_c} = k + \frac{V_c}{2R_o} \frac{\partial R}{\partial V_c} \quad (12)$$

Let $P_c$ be the power delivered to the thermistor by the servo-oscillator energy, then $$P_c = \frac{V_c^2}{4R} \quad (13)$$

whence $$\frac{\partial P_c}{\partial V_c} = \frac{V_c}{2R} \quad (14)$$

Equation 12 may now be rewritten as follows:

$$\frac{\partial V_1}{\partial V_c} = k + \frac{V_c}{2R_0} \times \frac{\partial R}{\partial P_c} \times \frac{\partial P_c}{\partial V_c} \quad (15)$$

Substitution of Equation 14 in Equation 15 then yields $$\frac{\partial V_1}{\partial V_c} = k + \frac{V_c^2}{4R_0} \times \frac{\partial R}{\partial P_c} \times \frac{1}{R} \quad (16)$$

By hypothesis, in order to keep the bridge in balance at all times, the power $P_c$ delivered to the thermistor from the servo-oscillator is always equal to the power delivered to the thermistor by the microwave energy $P_m$. Therefore, $$\frac{\partial R}{\partial P_c} = \frac{\partial R}{\partial P_m} \quad (17)$$

From Equation 11

$$\frac{\partial R}{\partial P_m} = \frac{\partial R}{\partial P_c} = \frac{\partial V_1}{\partial V_m} \times \frac{V_c}{V_m} \times \frac{4R_0}{V_c^2} \times R \quad (18)$$

Substitution of Equation 18 in Equation 16 reduces Equation 16 to $$\frac{\partial V_1}{\partial V_c} = k + \frac{V_c}{V_m} \times \frac{\partial V_1}{\partial V_m} \quad (19)$$

If Equation 19 is now substituted in Equation 4 and rearranged we have $$dV_1 = \frac{\frac{\partial V_1}{\partial V_m}dV_m}{1 - \frac{\partial V_0}{\partial V_1} \times \frac{\partial V_1}{\partial V_m} \times \frac{V_c}{V_m}\left[1 + \frac{k}{\frac{V_c}{V_m} \times \frac{\partial V_1}{\partial V_m}}\right]} \quad (20)$$

Provided that the carrier amplifier gain is high enough, $k$ approaches zero and the bracketed term in Equation 20 reduces to one.

Also, provided that the bandwidth of the carrier amplifier is broad enough to pass a reasonable range of modulation frequencies $$\frac{\partial V_0}{\partial V_1} \times \frac{\partial V_1}{\partial V_m} \times \frac{V_c}{V_m}$$

is much greater than one and Equation 20 then reduces to $$dV_1 = \frac{dV_m}{\frac{\partial V_0}{\partial V_1} \times \frac{V_c}{V_m}} \quad (21)$$

However, $$\frac{\partial V_0}{\partial V_1}$$

is the gain of the servo-oscillator amplifier and may be regarded as constant and also $$\frac{V_c}{V_m}$$

the ratio of servo-oscillation carrier amplitude to microwave carrier amplitude, is a constant by hypothesis. Therefore, Equation 21 shows clearly that $$dV_1 \cong dV_m \qquad (22)$$

Equation 22 expresses the simple fact that any change in modulation of the microwave carrier $V_m$ is translated directly into a change in modulation of the servo-oscillator carrier. Therefore, provided only that the servo-oscillator amplifier has adequate gain and bandwidth, the microwave modulation is translated directly through the medium of the thermistor to the low-frequency servo-oscillator carrier, whereby more conventional detection methods are made applicable.

The problem of detecting the modulation envelope of the servo-oscillator caused by the variation in microwave power is now much simplified. In Fig. 2 block 39 represents a conventional voltage detector.

Fig. 3 shows in detail the circuit of a servo-oscillator detector in accordance with the invention. Bridge network 30 is substantially the same as in the corresponding block shown in Fig. 2. Junction points 31, 32, 33 and 34 correspond to the points so numbered in Fig. 2. Resistors R8 and R10 located between junction points 31 and 32 and 32 and 33, respectively, are equal valued resistors. The combination of series resistors R6 and R7 between points 31 and 34 are chosen to be equal to the resistance reflected into the bridge arm defined by points 33 and 34 from thermistor 35 when thermistor 35 is matched in resistance to the waveguide or coaxial line in which the microwave signal is being measured.

Tuned amplifier 37 comprises, as shown in Fig. 3, vacuum tube amplifier V1, preferably of the pentode type for high gain having plate 50, control grid 51, cathode 52, screen grid 53, and suppressor grid 54, and tuned circuit 41. Control grid 51 is coupled to the output point 32 of bridge network 30 through blocking capacitor C1, and is grounded through grid-leak resistor R1. Cathode bias is provided conventionally by resistor R2, and capacitor C2 couples the cathode to ground 36 for alternating current. Suppressor grid 54 is tied to cathode 52. Filament power is supplied through conventional means not here shown.

In the plate circuit is connected the combination of a parallel resonant circuit comprising capacitor C5 and inductor L2 in parallel and a series resonant circuit in shunt therewith comprising capacitor C4, inductor L1 and resistor R4 in series. The purpose of the series resonant circuit is to flatten somewhat the frequency response curve of the combination so that the bandwidth of the tuned circuit is broad enough to provide relatively linear amplification over the range of modulation frequencies to be detected. Both resonant circuits are tuned to the 260 kilocycles per second frequency previously mentioned.

Direct-current power is supplied by any convenient source, such as source 45, shown as a battery for simplicity. Resistor R20 and capacitor C17 comprise a decoupling filter in accordance with well known practice. Resistor R3 is the screen dropping resistor and capacitor C3 is the screen bypass.

Because of the fact that amplifier 37 is tuned to 260 kilocycles per second, in effect the modulation envelope of the microwave signal applied to the thermistor is translated from a 6000 megacycles per second carrier to a 260 kilocycles per second carrier, and thus the process of final detection is greatly simplified.

Bridge driver 40 is coupled between the output of amplifier 37 and the input diagonal defined by points 31 and 33 of bridge network 30. It serves as a buffer stage for tuned amplifier 37 and as a driver stage for bridge 30. Driver 40 comprises a vacuum tube V2, shown as a pentode, having a plate 55, control grid 56, cathode 57, screen grid 58 and suppressor grid 59. Direct-current voltage is supplied to plate 55 from source 45 through decoupling filter R21, lead 75, the secondary winding of transformer T1 and lead 44. Direct-current voltage for screen-grid 58 is supplied from source 45 through resistors R21 and R9. Suppressor grid 59 is tied to cathode 57. Cathode bias is obtained from the voltage across resistor R6 in bridge arm 31—34.

The output of tuned amplifier 37 is coupled through capacitor C6 to the control grid 56 of tube V2, which is returned through grid-leak resistor R5 to the junction of resistors R6 and R7 in bridge 30. Cathode 57 is tied directly to point 31 on bridge 30 and plate 55 is connected by lead 44 directly to point 33. Thus the output of tube V2 is connected directly to the input diagonal of bridge network 30, and the bridge network forms the feedback path between output and input of tuned amplifier 37. The combination including V1, V2, and bridge 30 is a bridge-stabilized oscillator, here styled a servo-oscillator because the amplitude of oscillation must follow the unbalance of the bridge caused by ampltiude variations in the microwave signal applied to thermistor 35.

The remainder of Fig. 3 shows a voltage detector circuit 39 coupled to the servo-oscillator at the control grid 56 of tube V2 through capacitor C7 and lead 76. The loading effect on the oscillator of the detector circuit 39 is minimized by the use of a cathode follower buffer stage comprising triode V3 having a plate 60, cathode 61, and control grid 62. Plate 60 is connected directly to power source 45 as shown. Cathode 61 is grounded through resistors R12 and R13 in series. Resistor R12 is bypassed for alternating current by capacitor C19. The oscillator is coupled to control grid 62, which is provided with grid leak resistor R11. The output of the cathode follower is taken across resistor R13 and applied to a voltage doubler circuit comprising asymmetrically conducting diodes D1 and D2. A low pass LC filter comprising series inductors L3 and L4 and shunt capacitors C10, C11 and C12 attenuate the 260 kilocycle per second oscillator carrier wave and passes the modulation envelope. The filtered output is developed across resistor R15.

In order to provide a zero balance condition for the detector when no high-frequency power is present in the thremistor, the direct voltage developed across resistor R15 by the servo-oscillator carrier voltage must be balanced out. Control rheostat R18 is therefore inserted between the supply source 45 and the low side of resistor R15. Resistor R14 bypassed by capacitor C13 is connected between the low side of resistor R15 and ground so that a direct voltage is developed across resistor R14 opposite in polarity to the voltage across resistor R15. Rheostat R18 is adjusted initially to make the net voltage to ground from the high side of resistor R15 equal to zero. A microammeter M1 connected in series with an adjustable control resistor R16 is placed across resistors R14 and R15 to indicate the zero balance condition.

Following the zero balance control circuit is a resistance-capacitance filter which will limit the bandwidth and hence improve the signal-to-noise ratio of the detector circuit as previously described in connection with the equalized detector circuit. The filter comprises a resistor R17 followed by three selectable shunt capacitors C14 (2000 micromicrofarads), C15 (5000 micromicrofarads) and C16 (1000 micromicrofarads). The capacitance desired is switched across the output terminals 42 and 43 as desired by means of switch S1 connecting points 46 (capacitor C14), 47 (capacitor C15) and 48 (capacitor C16) to ground point 36. With switch S1 at point 49 none of the capacitors is used. It will be understood that output terminals 42 and 43 will be connected to a suitable indicator such, for example, as the oscilloscope shown in Fig. 1.

Figure 4:
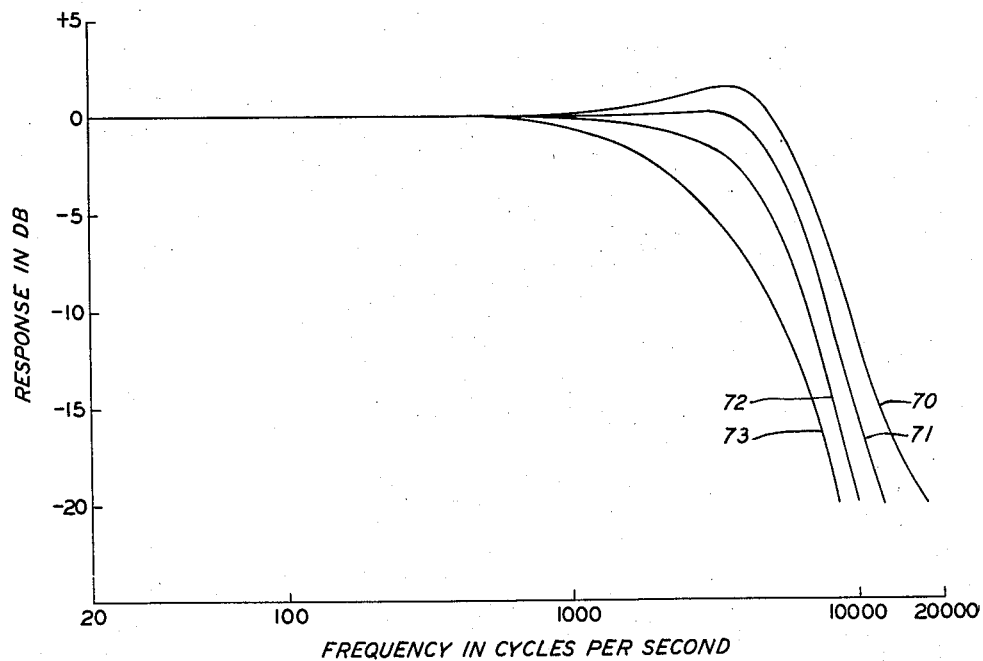
Fig. 4 is a graphical representation of the frequency response of the circuit shown in Fig. 3 to modulation frequencies.

Fig. 4 represents the frequency response obtainable with each of the capacitors switched across the output. Curve 70 shows the response characteristic with no capacitor across the output; curve 71, with capacitor C14 across the output; curve 72, with capacitor C15 across the output; and curve 73, with capacitor C16 across the output. The capacitance values given are representative. More or fewer separate values may be provided as desired.

The servo-oscillator circuit has been found to have the following advantages over the equalized detector circuit: (1) Automatic equalization of the thermistor frequency response when the thermistors or measuring heads are replaced; (2) fewer components; (3) greater stability; (4) the direct-current component is recovered without the necessity of re-insertion because detection occurs at a high level; and (5) freedom from the necessity of manually balancing the bridge circuit from time to time during the measurement.

The response to modulation-frequency is limited to about 6600 cycles per second in this illustrative embodiment of a servo-oscillator circuit, however, as compared with 8500 cycles per second in the previously described embodiment of an equalized detector circuit.

As compared with a conventional crystal detector the thermistor demodulation circuits provide these advantages: (1) Reflection at the high carrier frequency is considerably less; (2) The input-output law is constant over a wider range of modulation amplitudes; (3) The sensitivity is independent of carrier frequency; and (4) The stability is much greater with respect to time, temperature, and humidity.

Figure 7:
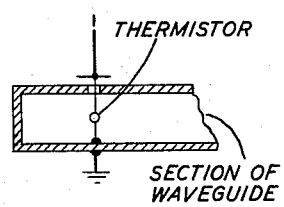
Fig. 7 is illustrative of a power measuring head useful in the practice of this invention.

Fig. 7 is illustrative of a measuring head for mounting the thermistor in a section of waveguide. Reference is made to "Technique of Microwave Measurements," previously cited, at page 140 for a description of such a device used for power measurements. The thermistor is so located in the measuring head as to absorb all of the energy coming from the high-frequency power source, that is, the thermistor resistance is made to match exactly the characteristic impedance of the waveguide. The thermistor may also be mounted in coaxial lines in properly matched measuring heads. Examples of coaxial mounts are illustrated and described in the cited volume on pages 130 through 136.

The servo-oscillator circuit described in detail herein is illustrative of a thermistor amplitude demodulator in the six kilomegacycle region of the microwave spectrum employing the principles of this invention. Various modifications as well as other embodiments will readily occur to one skilled in the art without departing from either the spirit or the scope of the invention.

What is claimed is:

1. A high-frequency signal detector comprising a Wheatstone bridge having four arms arranged with two opposite diagonals, a thermistor coupled to one of said bridge arms, a multistage high-gain amplifier having its input stage connected to one bridge diagonal and its output stage to the other bridge diagonal whereby said bridge is connected in a feedback path extending from said amplifier output stage to said amplifier input stage, said bridge and amplifier constituting a bridge-stabilized oscillator to provide oscillations at a frequency high enough to serve as a carrier for audio-frequency components but low with respect to said high frequency for automatically tending to balance said bridge irrespective of changes in the effective resistance of said thermistor tending to unbalance said bridge, means to apply high frequency signals of varying amplitude to said thermistor to change the effective resistance thereof for unbalancing said bridge whereby said oscillator is caused to vary proportionately the amplitude of its oscilaltions to tend to restore balance to said bridge, and means connected to an intermediate point of said amplifier ahead of its output stage for detecting the instantaneous amplitude variations of said last-mentioned oscillations as a measure of the amplitude of the high-frequency signals applied to said thermistor.

2. The envelope detector in accordance with claim 1 in which said detecting means include a low-pass reactive filter network for rejecting all frequencies above approximately nine kilocycles per second and a resistance-capacitance filter network for narrowing the bandwith of said detected output to improve the signal-to-noise ratio.

3. The detector in accordance with claim 1 in which said detecting means includes means for establishing a zero reference level when no high-frequency signal is being absorbed by said thermistor.

4. The envelope detector in accordance with claim 1 in which said detecting means comprises a voltage doubler, a cathode follower stage for connecting said intermediate amplifier point to the input of said voltage doubler, and filtering means connected to said voltage doubler.

5. In combination, a source of microwave energy modulated in amplitude, and means for detecting the amplitude of said last-mentioned energy, said detecting means comprising an oscillator including a tuned amplifier having a feedback circuit between an input stage and an output stage, said feedback circuit including a Wheatstone bridge with a thermistor in one bridge arm for controlling the amplitude of the oscillations produced by said oscillator, means for applying the microwave energy from said source to said thermistor to vary the effective resistance thereof in accordance with the modulated amplitude of said microwave energy, said resistance variations of said thermistor causing corresponding variation in the amplitude of the oscillations produced by said oscillator, and means coupled to an intermediate point of said amplifier ahead of said output stage for indicating the instantaneous amplitude variations of the oscillations of said oscillator as a measure of the instantaneously modulated amplitude of the microwave energy applied to said thermistor.

References Cited in the file of this patent

UNITED STATES PATENTS

| | | |
|---|---|---|
| 2,437,449 | Ames | Mar. 9, 1948 |
| 2,449,072 | Houghton | Sept. 4, 1948 |
| 2,799,826 | Eberle | July 16, 1957 |